United States Patent
Roberds et al.

(10) Patent No.: US 10,918,123 B2
(45) Date of Patent: Feb. 16, 2021

(54) RECONSTRUCTED BACON PRODUCT

(71) Applicant: SMITHFIELD FOODS, INC., Smithfield, VA (US)

(72) Inventors: James Roberds, Holt, MO (US); Charles O. Dairo, Smithfield, VA (US); Larry W. Hand, De Soto, MO (US)

(73) Assignee: SMITHFIELD FOODS, INC., Smithfield, VA (US)

( * ) Notice: Subject to any disclaimer, the term of this patent is extended or adjusted under 35 U.S.C. 154(b) by 114 days.

(21) Appl. No.: 16/189,149

(22) Filed: Nov. 13, 2018

(65) Prior Publication Data

US 2019/0142040 A1      May 16, 2019

Related U.S. Application Data

(60) Provisional application No. 62/585,224, filed on Nov. 13, 2017.

(51) Int. Cl.
| | |
|---|---|
| *A23L 13/60* | (2016.01) |
| *A22C 7/00* | (2006.01) |
| *A22C 17/00* | (2006.01) |
| *A23P 30/10* | (2016.01) |
| *A23L 13/00* | (2016.01) |
| *A23P 20/20* | (2016.01) |

(52) U.S. Cl.
CPC .............. *A23L 13/67* (2016.08); *A22C 7/003* (2013.01); *A22C 7/0007* (2013.01); *A22C 17/0026* (2013.01); *A23L 13/03* (2016.08); *A23L 13/62* (2016.08); *A23P 30/10* (2016.08); *A23P 20/20* (2016.08)

(58) Field of Classification Search
CPC ....... A23L 13/67; A22C 7/0007; A22C 7/003; A22C 17/0026; A23P 30/10
See application file for complete search history.

(56) References Cited

U.S. PATENT DOCUMENTS

| | | | | |
|---|---|---|---|---|
| 2,937,097 | A * | 5/1960 | Draudt | A23B 4/056 426/235 |
| 4,057,650 | A * | 11/1977 | Keszler | A23B 4/00 426/92 |
| 4,305,965 | A * | 12/1981 | Cheney | A23B 4/0235 426/104 |

(Continued)

FOREIGN PATENT DOCUMENTS

| | | |
|---|---|---|
| KR | 1020190030792 | 3/2009 |
| WO | 8000908 | 5/1980 |
| WO | 2016094371 A1 | 6/2016 |

*Primary Examiner* — Anthony J Weier
(74) *Attorney, Agent, or Firm* — McNees Wallace & Nurick LLC

(57) ABSTRACT

A reconstructed bacon product includes meat sourced exclusively from pork bellies. The product includes a cohesive mass of compressed layers of pork belly fat trimmings and pork belly lean trimmings of whole muscle segments. A method of forming a reconstructed bacon product includes obtaining pork belly lean trimmings of whole muscle segments and pork belly fat trimmings, macerating the pork belly lean trimmings, layering the pork belly lean trimmings and pork belly fat trimmings, compressing the layers, heat processing the layers in a mold to form a cohesive mass, and demolding the cohesive mass.

12 Claims, 3 Drawing Sheets

(56) References Cited

U.S. PATENT DOCUMENTS

| | | | | |
|---|---|---|---|---|
| 4,354,815 A | * | 10/1982 | Bardsley | A47J 37/1214 |
| | | | | 425/233 |
| 5,925,400 A | * | 7/1999 | Gundlach | A23L 13/60 |
| | | | | 426/417 |
| 6,086,352 A | * | 7/2000 | McFarland | A23L 13/60 |
| | | | | 425/131.1 |
| 2017/0354165 A1 | * | 12/2017 | Palmer | A23J 3/225 |

* cited by examiner

RECONSTRUCTED BACON PRODUCT

CROSS-REFERENCE TO RELATED APPLICATIONS

This application claims priority to and the benefit of U.S. Provisional Application No. 62/585,224 filed Nov. 13, 2017, which is hereby incorporated by reference in its entirety.

FIELD OF THE INVENTION

This application is directed to meat products and related processing techniques and more particularly to bacon and bacon production.

BACKGROUND OF THE INVENTION

Bacon is among the most popular meat products. As part of the bacon manufacturing process, pork bellies are often cut to achieve dimensions that make for easier handling during downstream operations. This results in the bellies being trimmed of both lean and fat, often resulting in as much as two to three pounds of trimmings per hog. Those trimmings, which had been part of one of the highest value parts of the pig, then become scrap with its highest use generally in sausage or other processed pork products having a significantly lower value.

It would be desirable to provide a product that makes use of those trimmings at a higher value than currently provided.

BRIEF DESCRIPTION OF THE INVENTION

Exemplary embodiments are directed to a reconstructed bacon product with meat sourced exclusively from pork bellies, the bacon product being formed of compressed layers of pork belly fat trimmings and pork belly lean trimmings of whole muscle segments.

In an exemplary embodiment, a reconstructed bacon product includes meat sourced exclusively from pork bellies. The product includes a cohesive mass of compressed layers of pork belly fat trimmings and pork belly lean trimmings of whole muscle segments.

In another exemplary embodiment, a method of forming a reconstructed bacon product includes obtaining pork belly lean trimmings of whole muscle segments and pork belly fat trimmings, macerating the pork belly lean trimmings, layering the pork belly lean trimmings and pork belly fat trimmings, compressing the layers, heat processing the layers in a mold to form a cohesive mass, and demolding the cohesive mass.

In some embodiments, the bacon product is 40 to 45% by weight fat, but can be formed with more or less than that amount.

Among the advantages of exemplary embodiments is that a pork belly can be reconstructed from trimmings that would otherwise go to waste or be used in lower value product streams. Additionally, because the trimmings used in forming the reconstructed pork belly are only pork belly trimmings, the resulting product can be accurately labeled as bacon.

Other features and advantages of the present invention will be apparent from the following more detailed description of exemplary embodiments that illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF EXEMPLARY EMBODIMENTS

Figure 1:
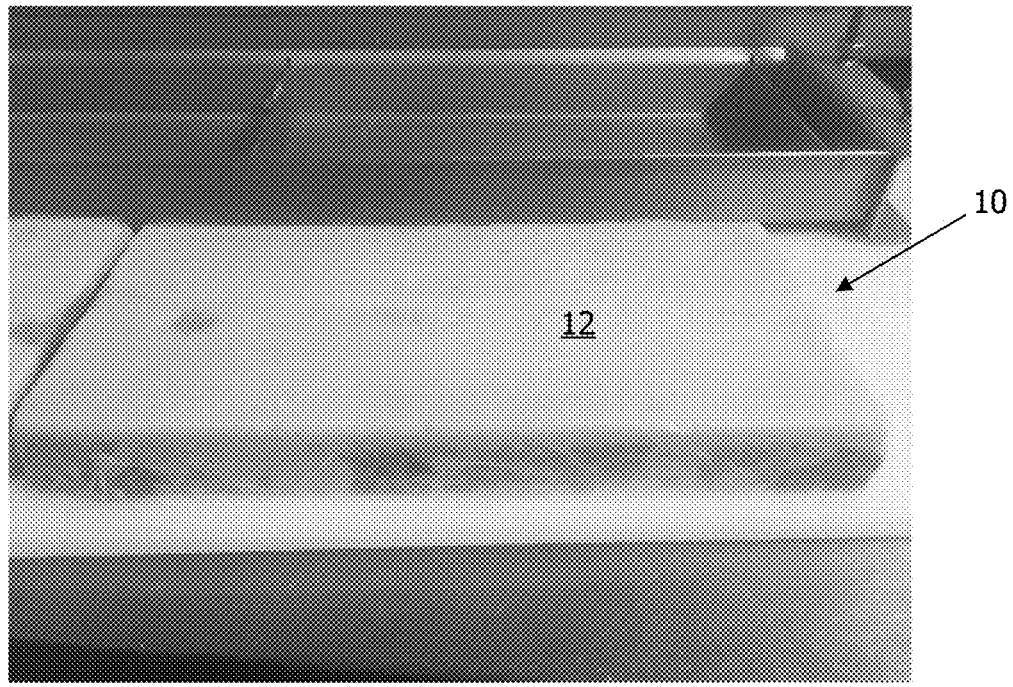
FIG. 1 shows a fat-side-up slab of reconstructed belly after demolding in an embodiment of the present disclosure.

Exemplary embodiments are directed to a manufactured pork product made from trimmings that are processed into a reconstructed form approximating that of a pork belly in its original state. Because the product includes pork bellies as its only source of meat, it can meet regulatory United States Department of Agriculture (USDA) standard of identity requirements for bacon and can be labeled as such. The manufactured pork product is thus a reconstructed bacon formed of compressed layers of pork belly fat trimmings and as well as pork belly lean trimmings of whole muscle segments.

The fat is sourced exclusively from pork belly and is primarily trimmings from the belly side strap and/or the belly fat back, although fat trimmings from any part of the belly may be used. The belly side strap is defined as the ventral edge of the belly trimmed to provide a rectangular shape. The belly fat back is defined as the dorsal edge of the belly trimmed to provide a rectangular shape. The fat trimmings make up about 40-45% by weight of the product, although amounts as low as 35% to as high as 50% or more are also suitable. The relative amounts of fat from the side strap and fat back may vary. It is possible to use only one of side strap fat or fat back, although many embodiments employ a mixture of the two. In some embodiments the weight ratio of fat from the side strap to fat back ranges from about 4:1 to about 1:4, in some embodiments ranges from about 3:1 to about 1:3, and in other embodiments ranges from about 2:1 to about 1:2. In some embodiments, the weight ratio of fat from the side strap to fat back is about 1:1.

The lean, like the fat, is sourced exclusively from pork belly and is primarily from the flank pocket, bootjack, or shoulder trim, although any lean trimmings from the pork belly may be used. The flank pocket is defined as the flank muscle portion left on the belly. The shoulder trim is the shoulder muscle portion left on the belly. The boot jack is defined as the posterior portion of the belly trimmed to make a rectangular shape.

Exemplary embodiments employ lean in the form of trimmings of whole muscle segments in producing the reconstructed pork belly. The lean makes up about 55 to 60% by weight of the product, although amounts as low as 50% and as high as 65% or more may also be suitable. In some embodiments the lean is made up entirely of one type of lean, but typically is some combination of flank pocket, shoulder trim, and boot jack. In some embodiments, when two different kinds or lean used, the weight ratio ranges from about 4:1 to about 1:4, in some embodiments ranges from about 3:1 to about 1:3, and in other embodiments ranges from about 2:1 to about 1:2 and may be about 1:1.

Neither the lean nor the fat is ground after trimming. Preferably, the lean and fat are not subjected to any kind of reduction process, including any kind of grinding, slicing or chopping to reduce the size. Rather, they are used directly in the same form as originally trimmed from the belly.

The lean is macerated to open up the whole muscle segments for protein extraction and to reduce the thickness of the muscle. The surfaces and/or edges of the lean may be macerated. Preferably, both surfaces of the lean are macerated. The maceration may be carried out by hand or through an automated device, such as those used for maceration of meats in other food processing. It will be appreciated that macerators can be set up in various ways depending on how one desires to score the muscle. Generally, macerators have two spring-loaded wheel rollers. In some cases, one roller is a series of knives and the other a solid roller, with this set up processing resulting in cutting only cut on one side of the muscle. Macerators can also be set up with two knife rollers. The gap between the macerator rollers determines the depth of cut on muscle. In systems having opposing knife rollers, macerators can be set to an overlap setting in which the gap between knives is substantially zero to achieve the maximum amount of maceration of the muscle. Maceration depth for processing the lean in accordance with exemplary embodiments can vary, but typically is at least 0.175 inches (0.44 cm) up to about 0.5 inches (1.3 cm). In some embodiments, the maceration is carried out using a machine with a knife depth setting of 0.25 inches (0.64 cm) and with an overlap setting.

Following maceration of the lean, the lean and fat are tumbled in a tumbler along with salt and curing ingredients. The tumbling helps get the fat coated with the proteins extracted from the lean during maceration, which aids in binding the fat and lean during subsequent molding operations. The tumbling is carried out in any kind of suitable industrial tumbler and in some embodiments is carried out under vacuum. The tumbling process usually lasts about 30 minutes to about 4 hours, typically between 1 and 2 hours. The tumbler may rotate at any desired rotational speed, although 15 to 40 revolutions per minute (rpm) is generally sufficient.

Ingredients to cure and/or flavor the meat can also be introduced during tumbling and may include any ingredients used in conventional bacon processing. Unlike conventional bacon processing in which curing ingredients and spices are typically injected into the belly as a solution, exemplary embodiments introduce these ingredients in particle form. Thus, exemplary embodiments do not introduce any added water, or minimum water that could cause the meat yield to exceed 100% in the finished product. Yield gains above 100% meat and ingredients (water) must be removed prior to packaging to be labeled by USDA as bacon.

These non-meat curing ingredients and spices may be added in any desired amounts, subject to any applicable regulatory restrictions (e.g., 120 parts per million (ppm) nitrite as an upper limit). Exemplary spices and curing ingredients include salt, cure accelerators (such as sodium erythorbate and sodium ascorbate, for example), binders (such as sodium phosphate, for example), nitrites (including sodium nitrite and/or natural sources of nitrite such as celery powder, etc., for example), liquid smoke, flavorings (e.g. maple, brown sugar, apple, etc.), and combinations thereof.

The tumbled ingredients are then introduced into a mold to form the reconstructed pork belly. The dimensions of the mold can be any desired size or shape, including rectangular, circular, etc. In exemplary embodiments, the molds may be sized for approximating the same dimensions as natural, post-trimming pork bellies from which the trimmings for the reconstructed belly were obtained. Thus, the dimensions of the mold may be suitable to produce reconstructed pork bellies packed, for example, to have weight ranges such as 10/12#, 12/14#, 14/16#, and 18# up. In some embodiments, the restructured bellies are formed to have dimensions of about 11 inches (28 cm) wide by about 1¾ inch (4.4 cm) thick. The length can be readily adjusted to any size desired (including lengths that exceed what would be expected in natural pork bellies), with longer bellies preferred due to improved slicing yield. Slice thickness is typically about one ounce (28 grams) per slice or about 16 slices per pound (35.3 slices per kg), although that may range from between about 8 slices per pound (17.6 slices per kg) up to about 28 slices per pound (61.7 slices per kg), or even outside that range depending upon consumer preference.

The fat and lean trimmings are preferably placed into the mold in alternating layers, although those layers may be loosely defined, given the irregularity of shape and thickness that results from the trimming and other processing. The layering may be carried out by hand or may be automated. The alternating layering of fat and lean replicates the appearance of a naturally-formed pork belly, which aids in the resulting aesthetic. Such alternating also helps in binding the individual pieces into a cohesive mass, as well as contributing to flavor and mouthfeel.

In some embodiments, a layer of fat from the tumbled fat pieces is applied to the bottom of the mold, which may be lined or coated for easier demolding. The layering may alternatively occur in a roll stock or thermal former machine prior to moving the layers to a mold. This may be desirable, for example, in using a vacuum to draw the layered mass into a more compact form as an intermediate step prior to placement in the mold.

In either case, in exemplary embodiments, the bottom layer of fat is built up to approximately 0.5 inches (1.3 cm) to about 0.75 inches (1.9 cm) thick, although it will be appreciated that variations in thickness of the bottom layer of fat may occur. The fat layer is followed by a layer of the lean covering the bottom fat layer. More fat is added to the lean and a second layer of lean is applied overlying the second layer of fat. In exemplary embodiments, each of the subsequent layers is about 0.5 inches (1.3 cm) thick, although any desired thickness may be employed, and the thickness of the layers may be independently varied. In some embodiments, it may be desirable to make the bottom layer of fat somewhat thicker than the other layers to aid in the aesthetic appearance of the final, sliced product. Additional fat and/or lean layers may continue to be applied as desired, although in some embodiments the product is a total of four alternating layers deep.

After the layering is completed, the layers are compressed within the mold. Any method for compressing the layers may be employed. Advantageously, in some embodiments the layers may be compressed by placing a lid over an open top of the mold and pressing the layers against the bottom and sides of the mold with the lid. This compression can alternatively be done using a horizontal roll stock machine, where the layers of fat and lean are placed in a formed film pocket and vacuum-packed to remove any air from the layers. The lid can be secured to the mold to hold the layers in their compressed form. As noted, a thermal former or other device may be used for compression intermediate the layering and placement into the mold.

The mold containing the compressed layers of fat and lean belly trim is then heat processed. The meat can be heat processed by any method to achieve a desired internal temperature. For example, in some embodiments the molds are transferred for heat processing in a smokehouse while in other embodiments the molds are placed in a steam cabinet or heat processed in a water tank. In some embodiments, the heat processing may occur in a time of about 1 to about 5 hours, such as about 2 to about 4 hours, to achieve an internal temperature of the meat that meets or exceeds about 135° F. (57.2° C.). It will be appreciated that the cook time to achieve a particular internal temperature may depend on a variety of factors, including the total dimensions of the meat form being heat processed.

Heat processing the layers of trim under compression results in the transformation of the individual pieces of trim into a single, cohesive form, as the proteins liberated by maceration set and bind the trimmings together.

The molds containing the now-cohesive meat mass are cooled and the meat mass is demolded. In some embodiments, it may be desirable to chill the meat mass to temperatures below freezing prior to demolding. Demolding may also occur above freezing, such as at refrigeration or room temperatures, and in some cases may be demolded at temperatures as high as about 120° F. (48.9° C.).

The resulting demolded mass is a reconstructed pork belly that can then be processed in much the same way as a naturally-formed pork belly. That is, the formed meat product can be sliced and packaged, with or without additional cold smoking prior to slicing and with or without pre-cooking of the slices prior to packaging. Additional seasonings, such as black pepper, may be introduced and also be applied to portions of the outer surface.

The demolded meat is so cohesively bonded together that it maintains its uniformity not only in the demolded mass, but also upon slicing and even after cooking such that the resulting slices do not de-bond or delaminate. Each slice instead remains a singular piece of food that can be enjoyed by a consumer in the same way as bacon slices cut from a natural pork belly.

Furthermore, because the resulting product is made from 100% pork belly and is formulated to have a yield equal to 100% of the meat weight, it meets current U.S. standard of identity requirements for bacon and can be labeled as such.

While discussed primarily herein with respect to bacon, it will be appreciated that the invention is not so limited and that other sources of pork besides pork bellies may be used alone, or in combination with the pork bellies and that embodiments of the invention may also be used in conjunction with other meats including, but not limited to, beef, venison, buffalo, lamb, and goat. It will be appreciated however, that embodiments which do not rely exclusively on pork bellies as the meat source cannot be labeled bacon under current standard of identity rules and thus are less preferred.

EXAMPLES

The invention is further described in the context of the following examples which are presented by way of illustration, not of limitation.

Example 1

Trimmings of pork belly fat (40% wt.) having an equal amount of side strap and back fat and pork belly lean (60% wt.) having an equal amount of flank trim and boot jack were obtained. The trimmings were injected with pickling spices and hand macerated followed by tumbling for one hour at 32 rpm.

Following tumbling and maceration, the trimmings were hand layered in a mold lined with plastic sheeting. After layering, the top layer was also covered with plastic, and the mold lid was applied and tightened to compress the layers. The mold was sent to a cooker for steam cooking the compressed layers of trimmings in a smokehouse environment to an internal temperature of 135° F. (57.2° C.), forming a cohesive pork belly mass. The cohesive pork belly mass was demolded, chilled, and sliced into individual bacon slices.

Example 2

Trimmings of pork belly fat (45% wt.) having an equal amount of side strap and back fat and pork belly lean (55% wt.) having an equal amount of flank trim and boot jack were obtained. The trimmings were mechanically macerated, followed by tumbling for two hours at 32 rpm in a pickling solution.

Following tumbling and maceration, the trimmings were randomly machine layered in a mold followed by steam cooking in a smokehouse environment to an internal temperature of 135° F. (57.2° C.), forming a cohesive pork belly mass. The cohesive pork belly mass was demolded, chilled, and sliced into individual bacon slices.

FIG. 1 shows the reconstructed belly slab 10 after demolding. The reconstructed belly slab 10 is oriented with the fat side 12 on top in FIG. 1.

Figure 2:
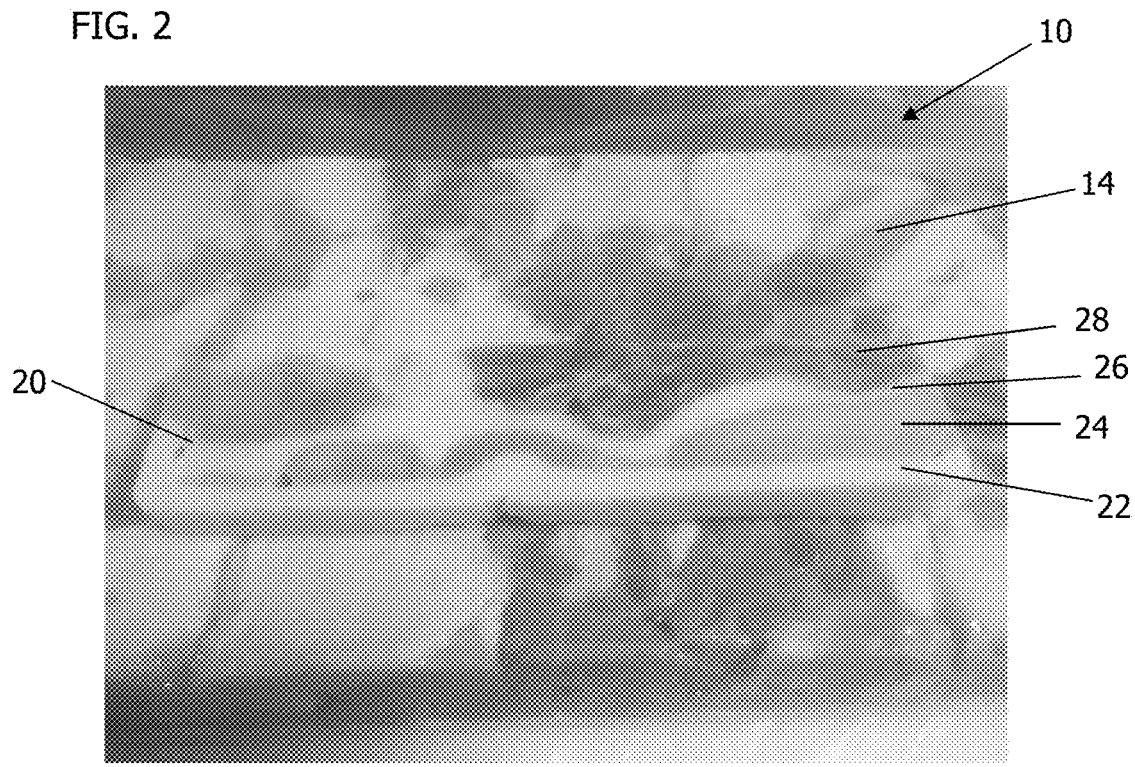
FIG. 2 shows a lean-side-up slab of reconstructed belly after demolding in an embodiment of the present disclosure with a cut slice on top of the slab.

FIG. 2 shows the reconstructed belly slab 10 oriented with the lean side 14 on top. A slice 20 of the reconstructed belly slab 10 is on top of the lean side 14 of the reconstructed belly slab 10. On the cut face of the slice 20, the alternating layers of the reconstructed belly slab 10 are visible and consist of a first fat layer 22 defining the fat side 12, a first lean layer 24 adjacent the first fat layer 22, a second fat layer 26 adjacent the first lean layer 24, and a second lean layer 28 adjacent the second fat layer 26 and defining the lean side 14.

Figure 3:
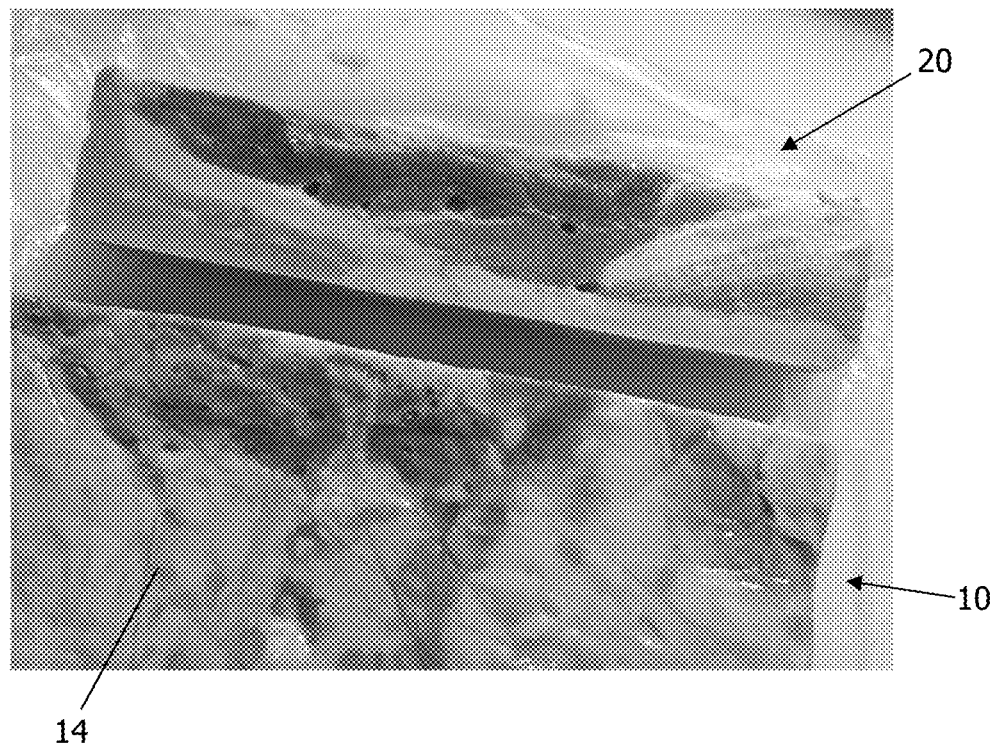
FIG. 3 shows a cut face of an individual slice of reconstructed belly alongside a slab in an embodiment of the present disclosure.

FIG. 3 shows a slice 20 next to a reconstructed belly slab 10.

Figure 4:
FIG. 4 shows a multi-slice section of reconstructed belly ready for packaging in an embodiment of the present disclosure.

FIG. 4 shows a multi-slice section 40 of reconstructed belly ready for packaging.

Figure 5:
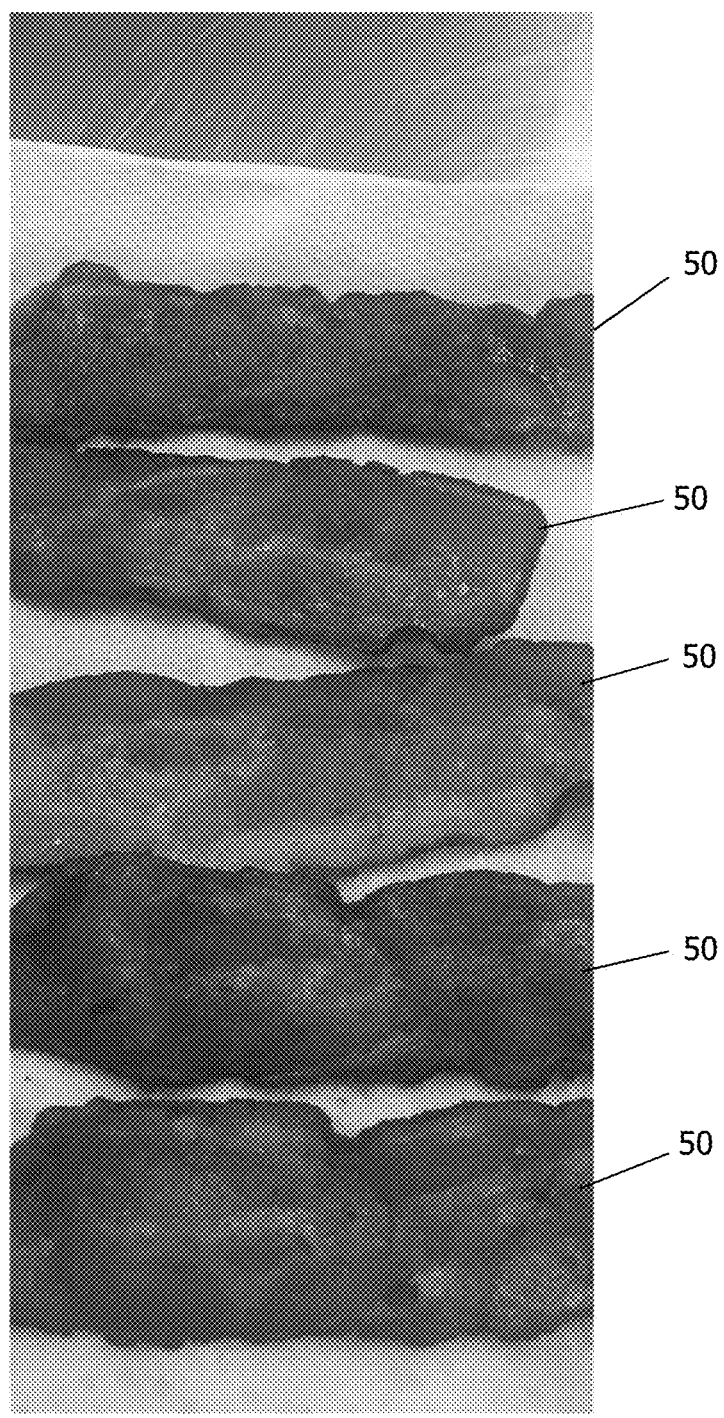
FIG. 5 shows slices of reconstructed belly after cooking in an embodiment of the present disclosure.

FIG. 5 shows bacon slices 50 of reconstructed belly after cooking and ready for consumption. The reconstruction process has provided sufficient cohesion between fat layers 22, 26 and lean layers 24, 28 to prevent separation of layers through the cooking process such that layers of a slice 20 of the reconstructed belly do not de-bond or delaminate but instead the slice 20 cooks into a single bacon slice 50.

Example 3

Trimmings of pork belly fat (45% wt.) having an equal amount of side strap and back fat and pork belly lean (55% wt.) having an equal amount of flank trim and boot jack were obtained. The trimmings were hand macerated followed by tumbling for two hours at 32 rpm in a pickling solution.

Following tumbling and maceration, the trimmings were hand layered in a mold followed by steam cooking in a smokehouse environment to an internal temperature of 135° F. (57.2° C.), forming a cohesive pork belly mass. The cohesive pork belly mass was demolded, chilled, and sliced into individual bacon slices.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A reconstructed bacon product comprising meat sourced exclusively from pork bellies, the product comprising a cohesive mass of compressed layers of pork belly fat trimmings and pork belly lean trimmings of whole muscle segments, wherein neither the pork belly fat trimmings nor the pork belly lean trimmings are subjected to any kind of reduction process to reduce the size after trimming and prior to forming the cohesive mass.

2. The reconstructed bacon product of claim 1 comprising about 40% to about 45% by weight fat.

3. The reconstructed bacon product of claim 1 comprising four alternating layers of fat trimmings and lean trimmings.

4. The reconstructed bacon product of claim 3 comprising a total of four alternating layers of fat trimmings and lean trimmings.

5. The reconstructed bacon product of claim 3 wherein each layer is about 0.5 inches (1.3 cm) thick.

6. The reconstructed bacon product of claim 1 wherein the pork belly fat trimmings comprise side strap and fat back.

7. The reconstructed bacon product of claim 6 wherein the weight ratio of side strap to fat back ranges from about 4:1 to 1:4.

8. The reconstructed bacon product of claim 1 wherein the pork belly lean trimmings of whole muscle segments are selected from the group consisting of flank trim, shoulder trim, boot jack, and combinations thereof.

9. The reconstructed bacon product of claim 8 wherein the weight ratio of flank trim to boot jack ranges from about 4:1 to 1:4.

10. The reconstructed bacon product of claim 1 further comprising non-meat products selected from the group consisting of salt, cure accelerators, sodium erythorbate, sodium ascorbate, binders, sodium phosphate, sodium nitrite, liquid smoke, flavorings, and combinations thereof.

11. The reconstructed bacon product of claim 1, wherein proteins liberated by maceration of the pork belly lean trimmings set and bind the layers together.

12. The reconstructed bacon product of claim 1, wherein the meat consists of the pork belly lean trimmings and the pork belly fat trimmings, and wherein the pork belly lean trimmings and the pork belly fat trimmings are sourced exclusively from pork bellies.

* * * * *